United States Patent
Offer

(12) 
(10) Patent No.: US 6,301,944 B1
(45) Date of Patent: Oct. 16, 2001

(54) METHODS OF FABRICATING MECHANIZED WELDING WIRE

(75) Inventor: Henry P. Offer, Los Gatos, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/401,798

(22) Filed: Sep. 22, 1999

(51) Int. Cl.[7] .................................................. B21D 3/06
(52) U.S. Cl. ........................................ 72/79; 140/147
(58) Field of Search ................................. 72/79; 140/147

(56) References Cited

U.S. PATENT DOCUMENTS

| | | | |
|---|---|---|---|
| 4,920,776 | * | 5/1990 | Denzler ............................... 72/79 |
| 5,473,923 | * | 12/1995 | Hochspach et al. ................ 72/79 |
| 5,564,299 | * | 10/1996 | Burns et al. ......................... 72/79 |
| 5,904,059 | * | 5/1999 | Perna ................................... 72/79 |

FOREIGN PATENT DOCUMENTS

19512 * 7/1975 (JP) ........................................ 72/79

OTHER PUBLICATIONS

"1998 ASME Boiler and Pressure Vessel Code," Section 13, "Winding Requirements," pp. 207–210.
"Wire Straightening and Cutting Machines," Shuster–Mettler Corp., 1999.

* cited by examiner

Primary Examiner—Ed Tolan
(74) Attorney, Agent, or Firm—Nixon & Vanderhye

(57) ABSTRACT

The method of fabricating low-cast, high-yield strength weld wire for welding includes displacing the weld wire through a rotary straightener having a pair of dies rotatable in opposite directions. Each die has a slider for introducing a bend in the wire as the wire is fed through entry and exit openings of the die. By rotating the dies in opposite rotational directions with bends introduced in the wire in the dies, the wire is cold work-hardened. The wire exiting the dies is wound on a spool. The weld wire when unwound from the spool has a low-cast and a high-yield strength.

5 Claims, 2 Drawing Sheets

METHODS OF FABRICATING MECHANIZED WELDING WIRE

BACKGROUND OF THE INVENTION

The present invention relates to a method of fabricating welding wire and particularly relates to fabricating weld wire having increased hardness and low cast in a continuous length for winding on a spool.

BRIEF SUMMARY OF THE INVENTION

Welding in locations having severely restricted physical access requires mechanized welding equipment to deliver the welding torch to the work surface. For processes using a non-consumable electrode and a wire feed such as tungsten inert gas welding, laser or electron beam welding (with wire feed) and plasma arc welding, the position of the wire as it enters the weld pool and the clearance of the wire to the electrode or power beam are difficult to control if the wire has continuously changing curvature, commonly called "cast." Cast is the permanent curvature remaining in wire which has been bent past its elastic limit, such as typically remains in wire after being unwound from a spool. Low-cast wire therefore has a very large radius of curvature; cast-free wire is essentially straight. The cast of spooled wire is a result of having been permanently bent as it was wound onto a spool hub and varies greatly as the wire on the outer layers is consumed and the take-off point progresses to the remaining wire on the inner layer on the spool, which has a significantly smaller radius of curvature.

For consumable electrode mechanized welding such as gas metal arc welding and submerged arc welding, variable wire cast can produce a variable position of the weld deposit. This, in turn, can lead to a lack of fusion, incomplete joint penetration and other significant weld defects.

In addition to cast control, the yield strength, commonly referred to as "hardness," of the wire controls its ability to be bent while being pushed through curved nozzles or guides without unnecessarily increasing its cast. Since the yield strength of commercial wire is not well controlled, the response of the wire as it is fed through a conduit and nozzle system is variable, resulting in variable welding performance as the wire cast varies. In addition, the value of the wire material's yield strength is not kept at its practical maximum value, i.e., just below its value at breaking during fabrication, but is significantly weaker.

A third problem of wire feeding during mechanized welding is catastrophic buckling of the wire in the wire feeder due to relatively high frictional resistance in the wire path. For a given alloy, the buckling strength is controlled by the wire diameter and its degree of cold work-hardening before use. The wire drawing/rolling (diameter reduction) processes are inherently limited in their ability to harden many alloys to their maximum strength, without damaging the drawing dies or risking tensile fracture of the wire. This effect is especially true for thin wire which is desirable for use with improved efficiency, lower heat input welding processes.

A fourth problem is the difficulty of sufficiently work-hardening the metallurgically preferred high-purity materials, such as vacuum-induction melted heats due to their inherently lower initial (soft condition) yield strength and/or rate of work-hardening when plastically strained in a wire straightener. The reduced final hardness of wires made from these materials makes them prone to various soft wire feeding problems described above, particularly if the wires are thinned as desired.

The above problems of existing wire strength are currently minimized or eliminated, in some cases, by locating the wire push mechanism such as a pair of drive rolls close to the torch so as to reduce the conduit length and corresponding friction. In other cases, a push mechanism is located remotely to the torch and a supplementary wire pull mechanism is located near the torch. Both of these means do not address the important case, where the access at the weld area is so severely reduced or limited that there is insufficient space for a pull mechanism and where the weld area is also far from the push mechanism, such as when small inside diameter pipes are joined by welding or are weld clad. Another situation not optimized by the existing wire fabrication and feed methods is welding inside pipes at locations where the weld head (including the wire feeder) is on the near side of elbows or other internal access restrictions and the torch is used on the far side of these restrictions.

Prior spooled welding wire fabrication relies on stationary offset-roll straightening of continuous lengths of welding wire to provide straight wire before it is wound on a spool and/or as it is unwound for use on a welding machine. Other than the drawing process itself, no attempt is made to work-harden the wire and increase its yield strength so that it cannot be permanently strained from its straight cast when wound on a storage spool of a predetermined diameter. Conventional roll straightening provides only a minimum degree of work-hardening, even if repeated a number of times.

The minimum diameter of a spool hub on which wire can be wound without plastic straining (exceeding the yield stress of the material at its given degree of hardness) is a function of the material type, its diameter and metallurgical history. However, for all known orbital or robotic welding applications where the spool must be low weight and dimensionally small enough to be manipulated as the work progresses, a significant and problematic small cast occurs in the wire due to being wound on the relatively small surface of the moving spool. This cast may vary in degree as the spool is emptied and the diameter of the remaining wound material is reduced, eventually to the hub diameter of the spool, where the smallest cast occurs.

In accordance with a preferred embodiment of the present invention, an improved method is provided for the manufacture of low-cast, full-hard spooled wire for use in automated or mechanized welding procedures. The low-cast wire is produced by using a modified commercial rotary arbor type of wire straightening machine originally designed for straightening short rigid lengths to both simultaneously straighten and significantly work-harden continuous flexible lengths. After hardening, these continuous lengths maintain sufficient elasticity to be wound on a spool without the typical high degree of cast and can be fed against high frictional forces in a welding system without buckling. This reduced-cast, increased yield strength spooled wire significantly improves the accuracy and reliability of feeding filler material into the molten pool during the welding process. The method is especially suited to critical applications such as remotely controlled cladding of small inside diameters (e.g., nuclear reactor vessel penetrations) and joining of limited access internal components where variations in cast are difficult to compensate for during welding. The method is also suited for welding with very low heat input where the weld pool size is small, requiring the wire aiming accuracy to be maintained to tight tolerances.

Weld wire formed in accordance with the preferred embodiment hereof has the technical advantage of being able to be reliably pushed against the higher friction of very long conduit lengths and/or through severely curved feed nozzles without catastrophic buckling of the wire which typically occurs in unsupported gaps of the wire feed mechanism. This buckling occurs when the compression in the wire required to push forward exceeds the wire's column strength in the longest unsupported span of its path to the final feed nozzle.

The present method also improves the productivity of making the wire by reducing/minimizing the number of straightening steps required to achieve a predetermined degree of straightness and hardness, as compared to the conventional drawing and straightening method. Since the needed straightening and hardening of the disclosed method is achieved primarily in a single pass through the final straightener, the prior inter-pass annealing steps normally required may be increased as desired to maintain softer material until the final single straightening step, at which time full straightness and hardness is achieved. The softer material obtained with annealing reduces die wear and corresponding wire surface scuffing relative to conventional practice, which relies primarily on the work-hardening of multiple die reductions rather than the final straightening and hardening step to achieve final hardness.

The additional work-hardening and corresponding resistance to plastic deformation of the fabrication method hereof increases the yield strength of the wire near the last step of its fabrication before being wound on a spool for subsequent use. The yield strength is increased by passing the continuous length of wire through a modified counter-rotating arbor straightening machine. This allows the wire to be much stronger in a single pass through the machine than can be achieved by multiple passes through the conventionally used sets of opposed, non-orbiting straightening wheels, i.e., roll straighteners.

The wire strength/hardness increase enables the wire to be bent around the hub of the spool with very reduced cast remaining after being unwound from the spool during use. This reduction in cast is especially important for maintaining the correct aim position of the wire as it is fed into the molten pool during welding since, as a minimum, the cast continually changes (increases) as the effective hub diameter (at the remaining radius of wire on the spool) is reduced, while the wire on the spool is consumed.

Further, wire emanating from the straightener and wound on the spool may have a helix or corkscrew effect. To preclude this effect, an indicator may be provided on an end of the wire as it emerges from the straightener, which will rotate, thus affording an indication that there is natural twist in the wire from the straightening process. To eliminate this helix or corkscrew effect, one or both of the sliders may be adjusted to increase or decrease the friction between the slider and the wire passing over the slider. Consequently, the wire emerging from the straightener has minimal or no helix or corkscrew effect.

In a preferred embodiment according to the present invention, there is provided a method of fabricating low-cast high-yield strength weld wire for welding comprising the steps of displacing weld wire through a rotary straightener having at least a pair of dies each having a slider and axially aligned entry and exit openings, fixing the slider in the first die to introduce a bend in the wire in a first direction as the wire is displaced through the first die, rotating the first die in a rotational direction about an axis corresponding to the axially aligned openings, fixing the slider in the second die to introduce a bend in the wire in a second direction opposite the first direction as the wire is displaced through the second die, rotating the second die in a rotational direction opposite the rotational direction of the first die about the axis and winding the wire onto a spool as the wire exits the exit opening of the second die.

In a further preferred embodiment according to the present invention, there is provided a method of fabricating weld wire having substantially no tendency to twist about an axis of the wire, comprising the steps of displacing weld wire through a rotary straightener having at least a pair of dies each having a slider and axially aligned entry and exit openings, fixing the slider in the first die to introduce a bend in the wire in a first direction as the wire is displaced through the first die, rotating the first die in a rotational direction about an axis corresponding to the axially aligned openings, fixing the slider in the second die to introduce a bend in the wire in a second direction opposite the first direction as the wire is displaced through the second die, rotating the second die in a rotational direction opposite the rotational direction of the first die about the axis, determining any tendency of the wire to twist about its axis and adjusting the slider of at least one of the first and second dies to adjust the friction between the one slider and the wire to counteract any tendency of the wire to twist.

DETAILED DESCRIPTION OF THE INVENTION

Figure 1:
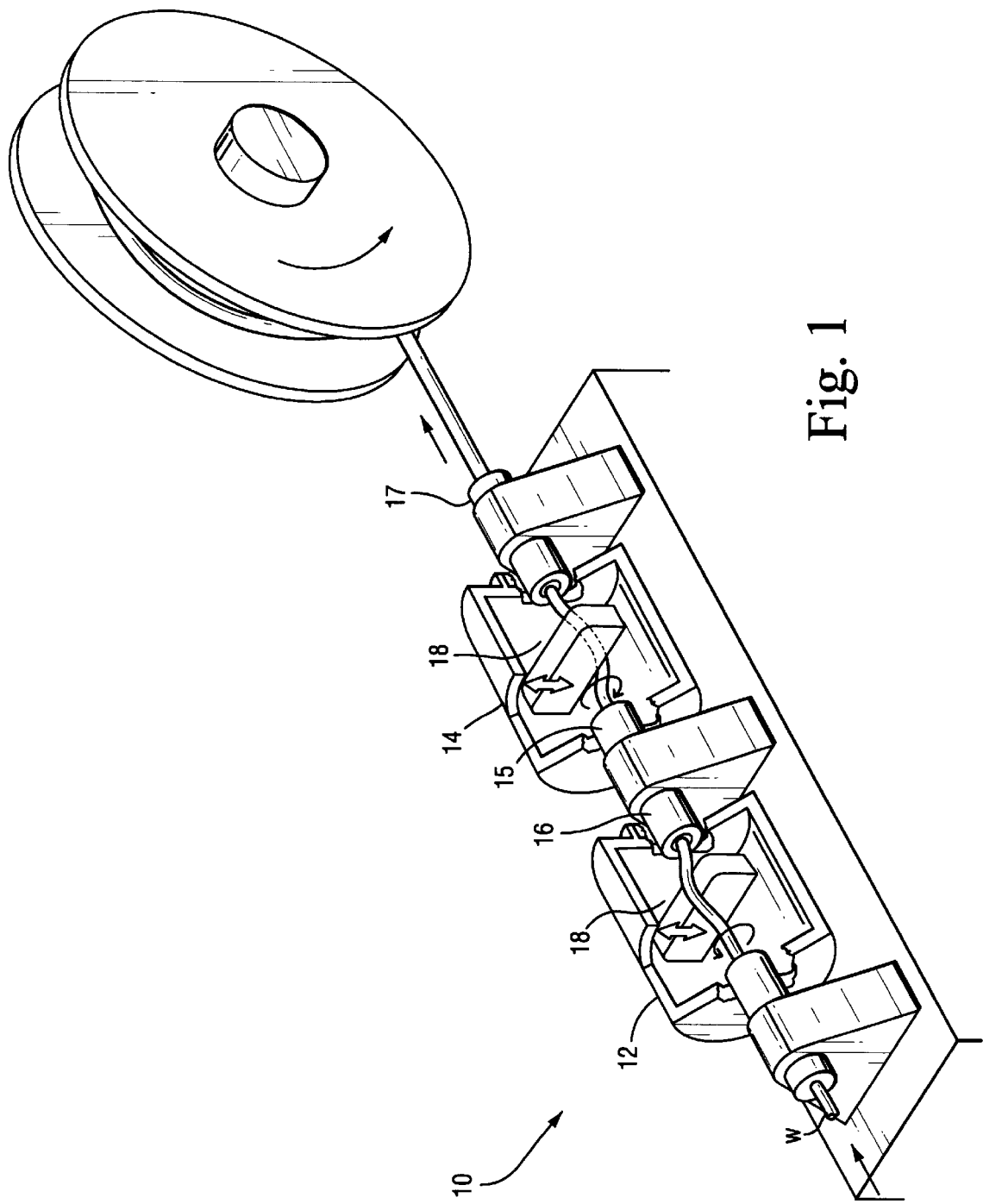
FIG. 1 is a schematic representation of a rotary wire straightener and spool for winding the wire.

Referring to the drawings, a rotary arbor straightening apparatus is schematically illustrated and generally designated 10 in the drawing figure. The apparatus includes at least a pair of wire dies 12 and 14, each mounting one or more sliders extending in a direction perpendicular to the passage of the wire through the dies 12 and 14. As illustrated, the wire W enters at one end 14 of the first die 12 and exits at the opposite end 16 of the first die and is bent by the one or more sliders 18 in the first die 12. The first die is rotating at very high speed about an axis coaxial with the wire entering and exiting the first die 12. Additional sliders 18 can be provided in each of the dies to support the wire as the die rotates to maintain the desired bend of the wire within the die.

The second die 14 is similarly constructed with one or more sliders 18. The sliders in the second die engage the wire to provide a bend to the wire. Similarly as the first die 12, the second die 14 has a wire entry opening 15 and a wire exit opening 17. The second die 14 is rotated at high speed in an opposite rotary direction in comparison with the direction of rotation of the first die 12. It will be appreciated that the location of each of the transverse sliders 18 in each die can be adjusted so that the curve or bend imparted to the wire as the wire passes through the dies 12 and 14 can be adjusted. The counter-rotating action of the pair of dies 12 and 14 cancels out any torsional action on the wire.

It will be appreciated that as the wire passes through the counter-rotating dies, the wire is cold-hardened and straightened. In a preferred embodiment of the present invention, the wire is provided with greater than a ¾-hardness, i.e., a hardness in excess of ¾ of the maximum hardness the wire will achieve in a cold state. In rotary straighteners of this type, the hardness of the wire was considered detrimental to winding the wire exiting from the rotary straightener on a spool, for example, a spool having a 4 or 8-inch diameter flange for use in welding. It was believed that a softer wire was necessary to roll on the spool. However, it has been found in accordance with the present invention that wire in excess of ¾-hardness and straightened with that hardness can be wound on a spool and unreeled from the spool with only a minimum cast. Thus, the wire as illustrated in the drawing figure is wound on a spool for subsequent unwinding and use in a welding technique. The wire unwound from the spool for welding has very substantial hardness, i.e., in excess of ¾-hardness, and a very low cast. For .example, the cast of a wire wound on an 8-inch spool after exiting from the rotary straightener may lie within 10 to 20 feet, whereas a standard roll straightener may have a cast for the same sized wire of about 4 feet. These dimensions refer to the diameter of the wire taken off the spool and reflect the final cast of the wire prior to use during welding. It will be appreciated that the spool may be of the type for fitting directly onto the mechanized welding machine or may comprise a large spool on which the wire, upon exiting the rotary die, may be wound for subsequent take-off and onto another spool for use on a welding machine.

With respect to the cast of the wire, it has been found that the cast when the wire is taken off the spool should be in excess of 10 times the diameter of the spool hub (the diameter of the hub without wire wound thereon). Additionally, the wire should lie along the stress/strain curve at a point above the yield point and below the fracture point and in the plastic region, preferably well toward the higher end of the stress/strain curve below the fracture point. Consequently, the wire has additional work-hardening and once processed, does not deform plastically but, rather, behaves elastically. For weld wire, this is highly desirable to pass the weld wire through curved guides of welding tools.

Typically, wire emanating from a rotary straightener has a helix or corkscrew effect. That is, if the wire was free and unsupported, the wire might take the configuration of a helix or corkscrew. This is disadvantageous when the wire constitutes a weld wire extending unsupported toward a weld pool because the weld wire might orbit as it is being fed. To preclude this helix or corkscrew effect, the one or both of the sliders are adjusted prior to spooling the wire as set forth below.

Figure 2:
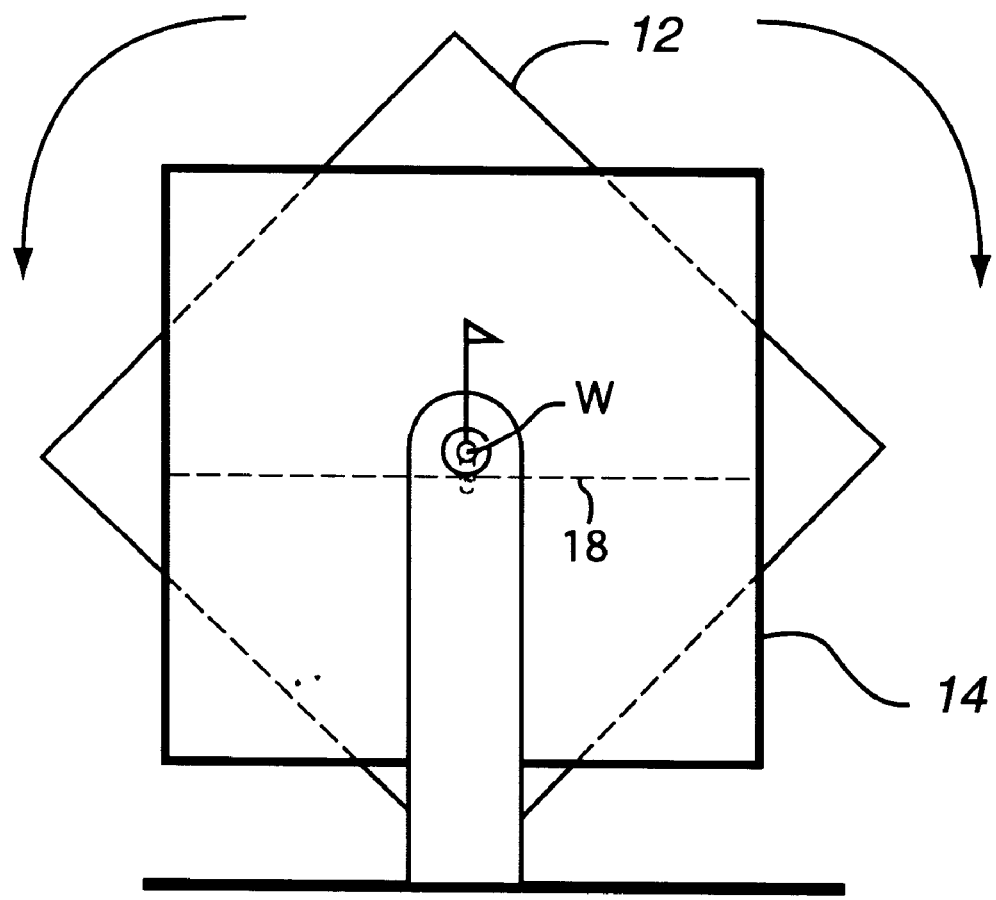
FIG. 2 is an end view looking from right to left from the exit opening of the second die illustrating a method of determining a corkscrew effect in the wire as the wire exits the straightener.

Referring to FIG. 2, the wire W is illustrated as it emerges from the second die. An indicator may be attached to the wire, for example, a flag. With the straightener in operation, any tendency towards a helix or corkscrew effect will produce a rotation of the indicator or flag. It will be appreciated that the friction between the sliders in the dies and the wire passing through the dies over the sliders should be the same to produce a straight wire having no twist. Thus, if the indicator or flag indicates a twist or corkscrew effect in the wire, the slider in one of the dies can be adjusted. For example, if the wire rotates in a clockwise direction when exiting the straightener, as illustrated in FIG. 2, it will be appreciated that the rotating die providing that clockwise rotation is too tight and engages the wire with too much friction. Thus, by adjusting the slider, i.e., relaxing the slider on the clockwise-rotating die in this example, the friction between the slider and wire can be reduced so that there is no indication of twist in the wire.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of fabricating low-cast weld wire for welding comprising the steps of:

displacing weld wire through a rotary straightener having at least a pair of dies each having a slider and axially aligned entry and exit openings;

fixing the slider in said first die to introduce a bend in the wire in a first direction as the wire is displaced through said first die;

rotating the first die in a rotational direction about an axis corresponding to the axially aligned openings;

fixing the slider in said second die to introduce a bend in the wire in a second direction opposite said first direction as the wire is displaced through said second die;

rotating the second die in a rotational direction opposite the rotational direction of the first die about said axis;

bending the wire in each of the first and second dies to introduce a hardness in the wire in excess of ¾-hardness; and winding the wire onto a spool as the wire exits the exit opening of the second die.

2. A method according to claim 1 including bending the wire in each of the first and second dies to introduce a cast in excess of 10 times the diameter of a hub of said spool.

3. A method according to claim 1 including adjusting the friction between one of the sliders in said first or second dies and the wire to substantially eliminate any tendency of the wire exiting the second die to twist in a helical manner about an axis of the wire.

4. A method according to claim 1 including bending the wire in each of the first and second dies to introduce a cast in excess of 10 times the diameter of a hub of said spool and adjusting the friction between one of the sliders in said first or second dies and the wire to substantially eliminate any tendency of the wire exiting the second die to twist in a helical manner about an axis of the wire.

5. A method of fabricating weld wire having substantially no tendency to twist about an axis of the wire, comprising the steps of:

displacing weld wire through a rotary straightener having at least a pair of dies each having a slider and axially aligned entry and exit openings;

fixing the slider in said first die to introduce a bend in the wire in a first direction as the wire is displaced through said first die;

rotating the first die in a rotational direction about an axis corresponding to the axially aligned openings;

fixing the slider in said second die to introduce a bend in the wire in a second direction opposite said first direction as the wire is displaced through said second die;

rotating the second die in a rotational direction opposite the rotational direction of the first die about said axis;

determining any tendency of the wire to twist about its axis; and adjusting the slider of at least one of said first and second dies to adjust the friction between said one slider and the wire to counteract any tendency of the wire to twist.

* * * * *